US008220835B2

(12) United States Patent
Green

(10) Patent No.: US 8,220,835 B2
(45) Date of Patent: Jul. 17, 2012

(54) DOCUMENT INCLUDING DATA SUITABLE FOR IDENTIFICATION AND VERIFICATION

(75) Inventor: Stephen Banister Green, Southampton (GB)

(73) Assignee: De La Rue International Limited, Basingstoke (GB)

( * ) Notice: Subject to any disclaimer, the term of this patent is extended or adjusted under 35 U.S.C. 154(b) by 365 days.

(21) Appl. No.: 12/308,410

(22) PCT Filed: Jul. 9, 2007

(86) PCT No.: PCT/GB2007/002551

§ 371 (c)(1),
(2), (4) Date: Jan. 9, 2009

(87) PCT Pub. No.: WO2008/007064

PCT Pub. Date: Jan. 17, 2008

(65) Prior Publication Data

US 2010/0231932 A1 Sep. 16, 2010

(30) Foreign Application Priority Data

Jul. 10, 2006 (GB) .................................. 0613707.9

(51) Int. Cl.
*G09C 1/00* (2006.01)

(52) U.S. Cl. .......................................... 283/17; 235/494

(58) Field of Classification Search ..................... 283/17
See application file for complete search history.

(56) References Cited

U.S. PATENT DOCUMENTS

| | | | | |
|---|---|---|---|---|
| 4,207,814 | A | 6/1980 | Schenk | |
| 5,396,559 | A | 3/1995 | McGrew | |
| 5,636,565 | A | 6/1997 | Lawrance et al. | |
| 6,173,896 | B1 | 1/2001 | Mürl | |
| 6,395,191 | B1 | 5/2002 | Schell | |
| 2006/0081710 | A1 * | 4/2006 | Streeter | 235/454 |

FOREIGN PATENT DOCUMENTS

| | | | |
|---|---|---|---|
| EP | 1 084 041 | B1 | 11/2003 |
| GB | 1 534 403 | A | 12/1978 |
| GB | 2 229 963 | A | 10/1990 |

* cited by examiner

*Primary Examiner* — Joanne Silbermann
*Assistant Examiner* — Kristina Junge
(74) *Attorney, Agent, or Firm* — Oliff & Berridge, PLC

(57) ABSTRACT

A document upon which a data sequence is placed, the data sequence comprising identification data (1) and verification data (3) in combination. The verification data (3) is physically distinguished from said identification data (1) within the data sequence in addition to any differences due to a difference in data between the identification data and verification data.

19 Claims, 3 Drawing Sheets

DOCUMENT INCLUDING DATA SUITABLE FOR IDENTIFICATION AND VERIFICATION

This invention relates to documents upon which identification data and verification data are placed in combination.

Generally the documents to which this invention relates are those that contain an identification data sequence in order to distinguish one document from another. This may be in the form of a number comprising a plurality of digits, or an alpha-numeric code. Typically different documents or different sets of documents will have different identification data sequences. Such data sequences can be read by machine reading apparatus known in the art to enable an automatic system to identify any document or set of documents.

The identification data may also be a serial number in which documents are numbered consecutively with adjacently produced documents differing from each other by one digit or letter in a readily recognised series.

Typically the identification data will be used for purposes associated with the security and/or administration of the documents, either in their production or in their use. Examples of documents which may require such identification sequences are banknotes, bonds, warrants, share certificates, vouchers, lottery tickets, identification documents, passports, membership cards, certificates of authenticity, birth certificates, marriage certificates, identity cards, voter registration cards, driving licences, residency permits and health cards.

For example, automated personalisation systems usually need to read a data sequence in a passport so that the controlling system can ensure that the actual physical passport number, which might be a letterpress number and/or a conventional laser perforated number, is tied up with the personal data to be printed, as well as with the passport number held in the stock control system. This means that the passport number has to be read absolutely correctly to ensure that the correct data goes into the correct passport, and that the stock control system is maintained and is consistent. Examples of such automated personalisation systems are the AS 1000 Automated Passport Personalisation System from SAFE ID Solutions AG or the SCP5600 or SCP5700 Card and Passport Personalisation Systems from Muhlbauer AG.

Misreading the number or having number substitution problems can therefore cause serious security problems which become potentially more significant with the advent of E-passports. The possibility of having passport numbers which differ on the passport, the chip and the machine readable passport (MRP) page would result in serious security issues.

Thus often verification data must be included in a data sequence which, when read with the identification data, allows an automatic system to check that such a data sequence is correct. By having longer and more complicated verification data more exact checks can be made to verify that an error has not occurred amongst the identification data. In these cases an automised system can perform the verification checks on a complete data sequence including identification data and verification data and provide a near instantaneous identification of an error.

There are many different types of verification data known in the art that can be used and a common solution is to include a check digit after a sequence of digits. This digit is chosen so that all the digits in the data sequence, including the check digit, satisfy a mathematical formula or equation. A common equation is known in the art as the "IBM check" which is used on the sequence of digits which make up a credit card number. The algorithm runs as follows: the digits in even positions, numbering from the right, are multiplied by two; any digits now greater than nine are reduced to a single digit by subtracting nine (equivalent to adding the two digits of the multi digit number); and finally all the digits in the sequence are summed and a check digit added to make the result evenly divisible by ten. Other possible check digit schemes also include the modulo 11 scheme used in the International Standard Book Number (ISBN) or the Electron Funds Transfer (EFT) routing number check which performs a modulo 10 operation on a weighted sum of the digits in a sequence.

U.S. Pat. No. 4,207,814 describes a method in which check digits are added to printed serial numbers on various documents. A serial number is consecutively advanced as each subsequent document is printed and a check digit is applied to the document to correspond with the printed serial number.

U.S. Pat. No. 6,395,191 describes a document in which an identification mark is repeated at another point by changing the local thickness of the document. In such a case part of the identification mark can be a check digit.

However, standards such as the "IBM check" and the ISBN check incorporated check digits as part of their initial design so that the check digit invisibly forms part of an expected number. Verification data is more difficult to integrate with existing identification data, present in existing databases or record sets, in situations where the expected identification data does not naturally include verification data. With large-scale databases, such as national identity schemes it is impossible to recall all old documents only containing identification data and release new documents containing integrated verification data. The inclusion of verification data can also confuse staff used to the previous incarnation of the data sequence, and this becomes more of a problem when faced with national agencies that process millions of documents.

In regard to machine reading systems, many systems that are being introduced to automatically read identification data can also have problems recognising whether a document is an old style document, containing only identification data, or a new style document, containing a mixture of identification and verification data.

The object of this invention is to enable the verification of a data sequence to be improved without overly compromising the readability of that data sequence, particularly when the data sequence is read by a machine and where the data sequence could contain a variety of data types.

According to this invention, there is provided a document upon which a data sequence is placed, the data sequence comprising identification data and verification data in combination, characterised in that the verification data is physically distinguished from said identification data within the data sequence in addition to any differences due to a difference in data between the identification data and verification data.

Hence any machine or human being reading the data sequence is aware of which parts of the data sequence form identification data and which parts form verification data and can therefore perform calculation and analysis appropriately.

The identification data could comprise symbols of a first symbolic alphabet and the verification data could comprises symbols of a second symbolic alphabet, the two symbolic alphabets having different forms. The identification and verification data could comprise alpha and/or numeric characters, typically aligned along a common axis, and the verification data is preferably numerically related to the identification data, for example in the form of a check digit.

One or both of the data types is also preferably readable by a machine reading system and the verification data is physically distinguished from said identification data within the data sequence in such a way as to enable the two data types to be distinguished and extracted by an automated reading device.

In some embodiments the verification data is represented as a non-alpha-numeric pattern, which represents a number. This number could be a check digit. The encoding of verification data within a pattern could be performed by having the non-alpha-numeric pattern comprise one or more markings in one or more positions, and the presence or absence of each marking in each position would then represent different verification data. Such a pattern could be a dot array, where the presence or absence of a dot in each position in the array codes for a certain amount of verification data, for example a check digit.

In other embodiments, the one or more alpha-numeric characters representing the verification data are physically distinguished from the one or more alpha-numeric characters composing the identification data in at least one of the following ways: by using one or more characters of a different size to the identification data; by using one or more characters of a different style of type to the identification data; or by using one or more characters of a different colour to the identification data. Additionally, the verification data could be physically distinguished from the identification data by printing the verification data in a different ink to the identification data or by using a different printing technique for each data type.

Preferably, the document is one of an identification document, a document of value, or a certificate of authenticity, where the identification data uniquely identifies the document, for example one of banknotes, bonds, warrants, share certificates, vouchers, lottery tickets, identification documents, passports, membership cards, certificates of authenticity, birth certificates, marriage certificates, identity cards, voter registration cards, driving licenses, residency permits and health cards.

In order that the invention may be better understood, some embodiments of the invention will now be described and contrasted with known and hypothetical examples with reference to the accompanying drawings in which.

Figure 1:
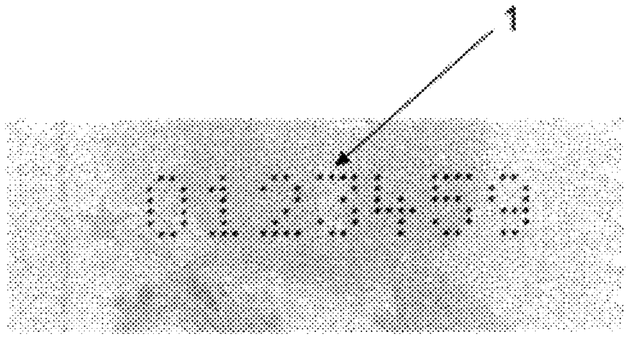
Fig. 1 Prior Art
FIG. 1 illustrates an example of an identification number within the prior art.

FIG. 1 is an illustration of a conventional form of the passport number 1 from a passport. Each passport number 1 is a number of characters long and can consist of a sequence of numbers or letters. The exact nature of the passport number 1 is determined by the issuing country of the passport. FIG. 1 shows an example where the passport number 1 is made up of digits only. Typically, the digits of the passport number 1 are imprinted upon the passport page using laser perforation.

As described previously the passport number 1 is often used as a primary key to assign and retrieve database data for an individual linked to the current passport. The number is typically read by a computer recognition system comprising a camera and recognition software running upon appropriate processing systems. With a standard passport there is no simple check that the passport number 1 has been read correctly. Hence, it is suggested to add a check digit to the passport number 1.

The passport number 1 will typically be read at various times during the lifetime of a given passport. During manufacture the passport number 1 will be read during personalisation to select the appropriate data for inclusion in the passport. It could also be read as a means to track the passport through a plurality of manufacturing steps and possibly as far as shipping and end delivery. Once a passport has been issued to an individual the passport number 1 can be read at immigration desks during foreign travel to register the arrival or departure of the individual. It could also be used at travel check in desks to retrieve personal information about an individual or check the individual in. All these situations could benefit from the use of a check digit to verify the passport number 1.

A passport number 1 will typically be read using a linescan camera or other types of imaging cameras known in the art. These cameras will be capable of capturing images of the relevant areas of a passport or document and the captured image will be used as an input to known pattern or optical character recognition programs. The passport being read will also typically be aligned and/or opened so that the correct part of the passport is presented to the camera. The handling of the passport can either be performed manually or using automated systems. The latter is generally used in large manufacturing runs.

Figure 2:
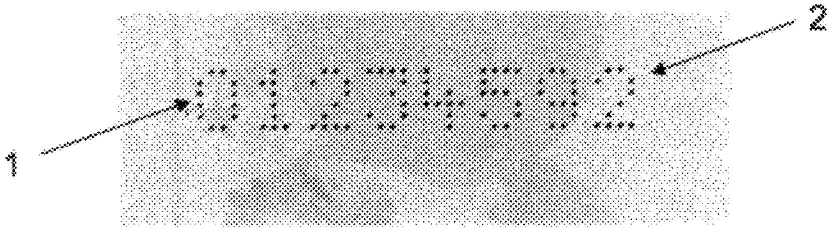
FIG. 2 illustrates an example of the combination of a check digit and an identification number.

FIG. 2 illustrates the addition of a check digit 2 to the passport number 1. The limits of the laser perforation printing technology mean that the check digit 2 appears in the same form as the proceeding passport number 1. This is typically the case with other documents as well, wherein the same printing apparatus would print the verification data as well as the identification data in one commonly orientated and indistinguishable data sequence. Thus an immigration officer or security personnel would not be able to tell a genuine passport number from a check digit and may enter in all or part of the number as an input into a computerised or paper-based immigration system.

Any machine reading system adapted to read the passport number 1 shown in FIG. 2 would also encounter problems. For example, if the passport number 1 is of variable length, a machine reading system may not be able to distinguish between a passport number with 8 digits and a passport number with 7 digits and a check digit. If an incorrect passport number is used as a reference for a particular passport then erroneous data may be linked to the passport.

Figure 3:
FIG. 3 illustrates an example of a distinguished check digit according to the present invention.
Figure 4:
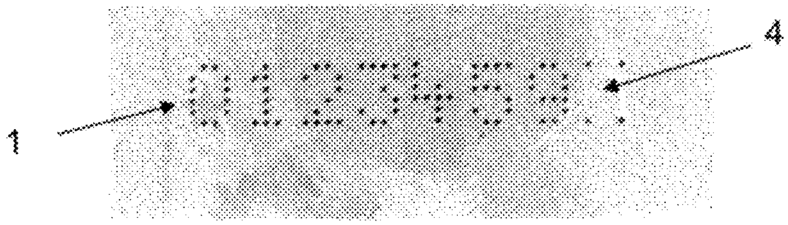
FIG. 4 illustrates another embodiment of a distinguished check digit according to the present invention.
Figure 5:
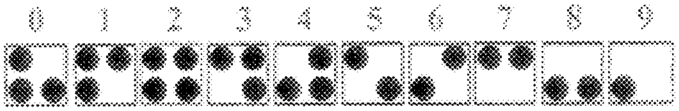
FIG. 5 illustrates an example of a coding scheme that can be used for a check digit according to the present invention.

Therefore, in order to prevent the confusion of the check digit 2 with the original passport number 1, and according to a first example of the invention, the check digit 3, 4 is physically distinguished from the passport number 1, in the present case by encoding the digit using a series of 4 dots; the presence or absence of a dot in each of the four corners of a transposition grid coding for a particular digit between 0 and 16. FIGS. 3 and 4 demonstrate different ways of printing this code and FIG. 5 illustrates the check digit transposition grid. Using these arrangements a human being can clearly differentiate between the identification number or data sequence and the check digit 3, 4. However, a machine adapted to read the passport number 1 can easily interpret the check digit code, and use the verification information for the verification of the read passport number 1. Alternatively, the trained personnel could also decode the check digit 3, 4 for use in a "back office" security check if the validity of the passport is doubted.

The scheme could be implemented in many different ways with the perforation holes in almost any position within a predetermined laser perforation window that defines the limits of each digit or character. However, the coded printed output must reside outside a position matrix of any individual digits or characters of the passport number 1 to prevent the misreading of the number by machine reading software.

The machine reading software can also be adapted to use the different form of the passport number 1 ("identification data") and the check digit 3, 4 ("verification data") to distinguish between the two data types. Thus the machine reading software does not need to know where the check digit is or how many different digits should be present, it can simply look for differences in the form. For example, the machine reading software could decide that all detected data resembling alpha-numeric digits, within a given range envelope representing the limits of the data sequence, represents the passport number 1 and any other symbol forms within the same envelope represent, or code, for a check digit.

Alternatively, pattern matching known in the art can be employed to link one set of patterns with identification data and another, different, set of patterns with the verification data. Thus a machine reading system presented with a passport number of variable length can identify the identification data by scanning for a given pattern, and determine whether the passport number is of the new type, which has a check digit, by scanning for the presence or absence of another pattern representative of the verification data.

If a check digit sequence of more than one character was required then more perforated dots can be used to increase the number space of the check digit. For example as each dot can effectively be on or off, 4 dots can represent up to 16 check digits and 5 dots can represent up to 32 check digits.

In other embodiments the size of each dot can be varied and used as a basis for differentiation within a machine reading device. Thus less dots would be needed to code for a set number of check digits. For example if a dot had three possible sizes, representing four ways in which a dot can be printed (including the absence of a dot), only 2 dots would be required to represent up to 16 check digits.

The dots could also be further distinguished by printing them in a different ink or a different colour, or by using a different printing method. A wide range of inks could also be used that would allow a check digit to be distinguished using the response of certain inks under different illumination. For example, the passport number 1 could be printed using inks that are viewable (i.e. emit or reflect visible light) under visible wavelength radiation and the check digit could be printed using inks viewable under infra-red (IR), or ultraviolet (UV) wavelength radiation. Alternatively, the machine reading apparatus could be adapted to distinguish between the two data types based on the detected wavelength of radiation reflected or emitted by each ink under different illumination conditions. The different printing methods or techniques that could be used include, but are not limited to, inkjet printing, laser marking, laser ablation, lithographic printing, flexographic printing, screen printing, intaglio printing, gravure printing, letter-pressing, laser toner printing, laser perforation, toner transfer, thermal transfer or embossing.

Figure 6:
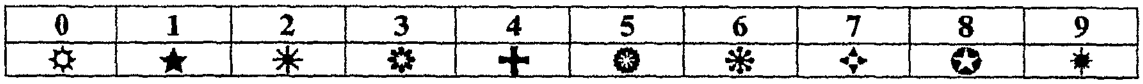
FIG. 6 illustrates an example of a non-alpha-numeric character coding scheme that can be used for a check digit according to the present invention.

An example of another coding scheme that could be used according to the present invention is illustrated in FIG. 6. Using this scheme verification data could be distinguished from a passport number by representing the verification data as one or more non-alpha-numeric characters. A machine reading device would then be configured to detect these characters and decode the verification sequence.

The check digit could also comprise alpha-numeric characters distinguished using the methods described previously or further printed in a different orientation, in a different font, in a different type, or as a different size. These distinctions between the two types of data need to be clear from the point of view of a human reader who is unconcerned with the verification data.

This system thus allows verification data such as a check digit to be incorporated into new documents such as passports, without the need for retraining millions of staff around the world or recalling all documents. All a lay-person or machine reading system will see on examining a new document is a distinguished marking or character, which they can be told to distinguish and ignore.

The same technique can be used in a second embodiment with relation to sequential numbering on security documents such as banknotes. Typically a number of documents will be produced and these documents will be numbered sequentially for security purposes. A check digit can be added to this serial number in order to make counterfeiting the document more difficult. The use of a check digit presents problems for the counterfeiter as the check digit must be altered for each serial number. A simple check for validity is thus to see whether the check digit matches the serial number, as many counterfeiters would normally just print an arbitrary number upon the counterfeited document.

Figure 7:
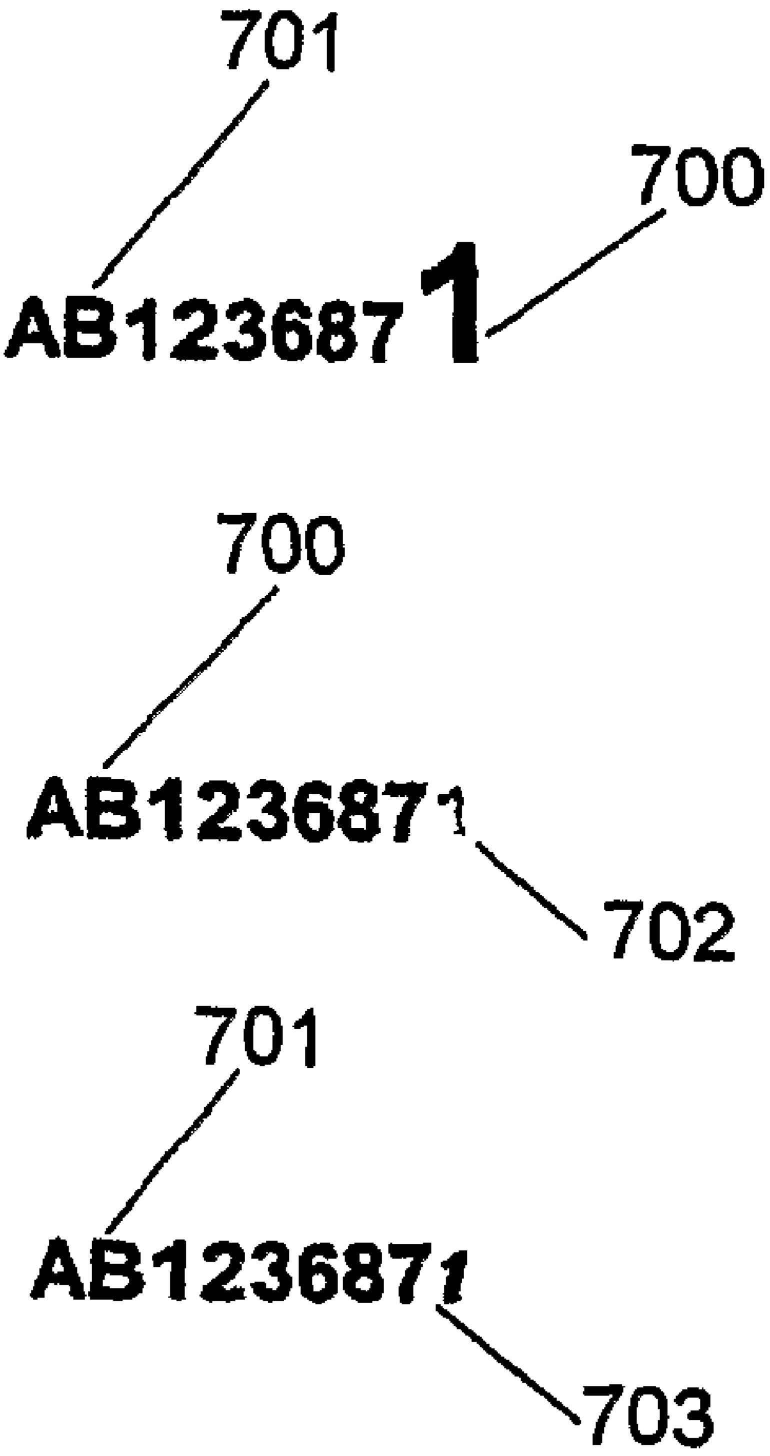
FIG. 7 illustrates three more examples of different distinguishing techniques according to the present invention.

This check digit can further be located anywhere within the data sequence to produce more problems for the counterfeiter. Typically, the serial number and check digit are printed as one continuous data sequence, undistinguished in form and orientated with a common axis. However, a human or machine reading device may still need to read the serial number separately from a check digit for the use in conventional legacy applications. To do this the check digit is physically distinguished from the remaining serial number. This could be performed in a number of different ways, which are illustrated in FIG. 7. For example making the check digits significantly larger 700 or smaller than the serial number digits 701; making the check digit a different colour to the other serial number digits; printing the check digit in a different ink 702 to the other serial number digits 701; printing the check digit using a different technique to the other serial number digits; or printing the check digit in a different font 703 to other serial number digits 701.

When a different ink is used then the check digit may be printed using invisible fluorescence inks. In this case the check digit is invisible to the naked eye and is only visible under ultraviolet illumination. Thus the machine reading optical apparatus could be equipped with a UV LED to read the check digit and use it to verify the serial number without any standard operator being able to locate the check digit.

The invention claimed is:

1. An identification document upon which a data sequence configured for optical reading is placed, the data sequence comprising, in combination, identification data that uniquely identifies the document and verification data suitable for verification of the data sequence, wherein:

the identification data is represented by alpha-numeric characters marked on the document, each alpha-numeric character being formed of a dot array;

the verification data comprises a check digit represented by a non-alpha-numeric pattern marked on the document, the non-alpha-numeric pattern being a dot array, the check digit and the identification data together satisfying a verification formula, and the alpha-numeric characters of the identification data and the non-alpha-numeric pattern of the verification data are aligned along a common axis on the document.

2. A document as claimed in claim 1, wherein the identification data comprises a set of numeric characters.

3. A document as claimed in claim 1, wherein the verification data is machine readable.

4. A document as claimed in claim 3, wherein the identification data is machine readable.

5. A document as claimed in claim 4, wherein the verification data is physically distinguished from said identification data within the data sequence in such a way as to enable the two data types to be distinguished and extracted by an automated reading device.

6. A document as claimed in claim 1, wherein the non-alpha-numeric pattern of the verification data represents a number.

7. A document as claimed in claim 1, wherein the non-alpha-numeric pattern of the verification data comprises one or more markings in one or more positions, the presence or absence of each marking in each position representing different data suitable for verification.

8. A document as claimed in claim 1, wherein the verification data is physically distinguished from the identification data by printing the verification data in a different ink than the identification data.

9. A document as claimed in claim 8, wherein the ink used to print the identification data is viewable when exposed to electromagnetic radiation of a first wavelength or band of wavelengths and the ink used to print the verification data is viewable when exposed to electromagnetic radiation of a second wavelength or band of wavelengths.

10. A document as claimed in claim 1, wherein the verification data is physically distinguished from the identification data by printing the verification data using a different printing technique than the identification data.

11. A document as claimed in claim 10, wherein the different printing techniques are chosen from one of: inkjet printing, laser marking, laser ablation, lithographic printing, flexographic printing, screen printing, intaglio printing, gravure printing, letter-pressing, laser toner printing, laser perforation, toner transfer, thermal transfer or embossing.

12. A document as claimed in claim 1, wherein the data sequence is placed upon the document by one of inkjet printing, lithographic printing, flexographic printing, screen printing, intaglio printing, gravure printing, letter-pressing, laser printing, laser perforation, toner transfer, or embossing.

13. A document as claimed in claim 1, wherein the document is one of passports, membership cards, birth certificates, marriage certificates, identity cards, voter registration cards, driving licenses, residency permits and health cards.

14. A document as claimed in claim 1, wherein the common axis extends in a direction of text of the alphanumeric characters of the identification data.

15. A document as claimed in claim 1, wherein the dot array of the identification data and the dot array of the verification data are the same type.

16. A document as claimed in claim 1, wherein a height of the dot array of the identification data is the same as a height of the dot array of the verification data.

17. A document as claimed in claim 1, wherein the dot array of the identification data comprises at least one dot region, each dot region corresponding to a respective alphanumeric character of the identification data;

each dot region has a height dimension having a first number of dot locations and a width dimension having a second number of dot locations, thereby defining an area dimension of the dot region having a number of dot locations equal to the first number of dot locations times the second number of dot locations, and the dot array of the verification data is formed in at least one dot region.

18. A document as claimed in claim 17, wherein the dot array of the identification data comprises a plurality of dot regions equal to a number of alphanumeric characters in the identification data, and the dot array of the verification data has one dot region.

19. A method of manufacturing an identification document, comprising: generating a data sequence, comprising, in combination, identification data that uniquely identifies the document and verification data suitable for verification of the data sequence;

obtaining the verification data by calculating a check digit based on the identification data using a verification formula;

marking the identification data, represented by alpha-numeric characters configured for optical reading, on the document, each alpha-numeric character being formed of a dot array; and marking the verification data, represented by a non-alpha-numeric pattern, in the form of a dot array, on the document such that the alpha-numeric characters of the identification data and the non-alpha-numeric pattern of the verification data are aligned along a common axis on the document.

* * * * *